United States Patent
Pan et al.

(10) Patent No.: US 11,915,252 B2
(45) Date of Patent: Feb. 27, 2024

(54) METHOD FOR IDENTIFYING KEY ELEMENTS THAT AFFECT EMERGENCE OF GLOBAL EFFICIENCY OF RAIL TRANSIT SYSTEM AND SIMULATION SYSTEM FOR IMPLEMENTING THE SAME

(71) Applicant: TONGJI UNIVERSITY, Shanghai (CN)

(72) Inventors: Deng Pan, Shanghai (CN); Zejun Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 198 days.

(21) Appl. No.: 16/942,662

(22) Filed: Jul. 29, 2020

(65) Prior Publication Data
US 2021/0035130 A1  Feb. 4, 2021

(30) Foreign Application Priority Data
Jul. 30, 2019  (CN) .......................... 201910695028.4

(51) Int. Cl.
*G06Q 10/00* (2023.01)
*G06Q 30/0202* (2023.01)
(Continued)

(52) U.S. Cl.
CPC ......... *G06Q 30/0202* (2013.01); *G06Q 10/04* (2013.01); *G06Q 10/06315* (2013.01); *G06Q 10/06393* (2013.01); *G06Q 50/30* (2013.01)

(58) Field of Classification Search
None
See application file for complete search history.

(56) References Cited

U.S. PATENT DOCUMENTS

| 2006/0242154 A1* | 10/2006 | Rawat ................... G06F 16/168 |
| 2011/0112908 A1* | 5/2011 | Rowley ............ G08G 1/096811 |
| | | 701/532 |

(Continued)

FOREIGN PATENT DOCUMENTS

CN  109101672 A  12/2018

OTHER PUBLICATIONS

Hui Hu, Keping Li, and Xiaoming Xu (A multi-objective train-scheduling optimization model considering locomotive assignment and segment emission constraints for energy saving, J. Mod. Transport. (2013)). (Year: 2013).*

(Continued)

*Primary Examiner* — Hafiz A Kassim

(57) ABSTRACT

A method for identifying key elements that affect emergence of global efficiency of a rail transit system and a simulation system based on evolution of intelligent group behaviors for implementing the method. The global efficiency of the rail transit system is determined in form of an index vector. Around the index vector of the global efficiency, the agent models of the micro-subjects in the rail transit system and a simulation system of the emergence of the global efficiency based on the evolution of intelligent group behaviors are established. An algorithm implemented in the simulation system is established to identify key elements of the emergence of the global efficiency of the rail transit system. The method and the simulation system of the present disclosure provide a systematic solution for the improvement of the global efficiency of the rail transit system.

7 Claims, 9 Drawing Sheets

(51) Int. Cl.
    *G06Q 10/04*     (2023.01)
    *G06Q 10/0631*     (2023.01)
    *G06Q 10/0639*     (2023.01)
    *G06Q 50/30*     (2012.01)

(56) References Cited

U.S. PATENT DOCUMENTS

| | | | |
|---|---|---|---|
| 2013/0079964 A1* | 3/2013 | Sukkarie | G01C 21/3697 |
| | | | 701/1 |
| 2014/0046585 A1* | 2/2014 | Morris, IV | G06Q 10/047 |
| | | | 701/400 |
| 2017/0077701 A1* | 3/2017 | Meier | G05B 17/02 |
| 2017/0268948 A1* | 9/2017 | List | G01M 17/007 |

OTHER PUBLICATIONS

Rongfang (Rachel) Liu, Iakov M. Golovitcher (Energy-efficient operation of rail vehicles, Transportation Research Part A 37 (2003) 917-932). (Year: 2003).*

Jiateng Yin (Dynamic passenger demand oriented metro train scheduling with energy-efficiency and waiting time minimization: Mixed-integer linear programming approaches, Transportation Research Part B 97 (2017) 182-213). (Year: 2017).*

"Study on the performance improvement of urban rail transit system" Zhenhuan Deng Pan, Liting Zhao, Qing Luo, Chuansheng Zhang, and Zejun Chen—Energy 161 (2018) 1154e1171 ScienceDirect (hereinafter Pan et al.) (Year: 2018).*

\* cited by examiner

METHOD FOR IDENTIFYING KEY ELEMENTS THAT AFFECT EMERGENCE OF GLOBAL EFFICIENCY OF RAIL TRANSIT SYSTEM AND SIMULATION SYSTEM FOR IMPLEMENTING THE SAME

CROSS-REFERENCE TO RELATED APPLICATIONS

This application claims the benefit of priority from Chinese Patent Application No. 201910695028.4, filed on Jul. 30, 2019. The content of the aforementioned application, including any intervening amendments thereto, is incorporated herein by reference in its entirety.

TECHNICAL FIELD

The present application relates to energy-saving technologies in rail transit systems, and more particularly to a method for identifying key elements that affect emergence of global efficiency of a rail transit system, and a simulation system for implementing the method based on evolution of intelligent group behaviors.

BACKGROUND

High capacity, high reliability and low emissions make rail transit systems greatly developed, and even vigorous expansion of the rail transit system is achieved in some large cities. For a large-scale rail transit system, it is of great significance to save energy and improve efficiency. At present, the worldwide researches on energy conservation and efficiency improvement of the rail transit systems generally focus on the reduction of energy consumption and the improvement of rapidity, which are mainly realized by controlling train behaviors and optimizing train schedules. Some researches further focus on the energy efficiency improvement of the rail transit systems, where a large proportion of the researches simplifies the energy efficiency to the reduction of energy consumption and the improvement of rapidity, and in some documents, the energy efficiency is regarded as the efficiency to be studied. Actually, the efficiency is a comprehensive index for evaluating the performance of the rail transit systems.

Currently, simulation tools widely used in the rail transit industry include RailSys (Germany), SysTra (French) and OpenTrack (Swiss), which can be used for demand analysis and planning, operation capability analysis, train behavior analysis, train schedule optimization, signaling system analysis, system fault and delay simulation, and energy consumption analysis of the rail transit systems. However, these simulation tools have the following disadvantages. For example, the technological ability to simulate the behavior evolution and interaction of such micro-subjects as a control center, control sub-centers, lines, stations and trains under complex road network conditions needs to be enhanced. In addition, energy efficiency, rapidity, and utilization of transport capacity are not integrated into a unified "efficiency" index to simulate the efficiency status of the rail transit system, failing to identify the key elements that affect the emergence of the global efficiency through simulation calculation, evaluation and optimization.

The emergence is manifested as a macro behavioral characteristic that exceed the sum of individual intelligence and abilities, where the micro-subjects in the rail transit system interact, restrict and cooperate with each other in spatio-temporal behaviors, aiming at the optimal global efficiency according to the dynamic spatio-temporal distribution of transportation tasks and dynamic environmental factors. For a large-scale rail transit system, a large number of micro-subjects in the road network such as independent stations, trains, control (dispatch) centers at all levels (lines, road networks) interact, complement and restrict each other in a process of concurrent collaboration according to the spatio-temporal distribution of transportation tasks and dynamic environmental factors. This leads to the "emergence of efficiency" which shows a macro behavioral characteristic that exceeds the sum of individual intelligence and abilities. In order to master the mechanism of efficiency generation of the rail transit system, it is required to deeply understand the meaning of "emergence", so as to seek methods and approaches for global optimization of system efficiency under the guidance of the efficiency emergence mechanism.

Energy efficiency is not only one of core issues of efficiency, but also a key and a difficulty in improving the efficiency of the rail transit systems. Since the main contradiction that needs to be resolved for efficiency improvement at the different development stages of the rail transit systems is not constant, the concept of "emergence" is introduced to deeply study the systematic methods for global efficiency improvement. Therefore, it is a challenge for the worldwide enterprises and academic circles to realize the energy saving and efficiency improvement of the rail transit system, not only the energy efficiency of the rail transit system should be paid more attention to, but also other indicators of the efficiency.

SUMMARY

In order to overcome the above-mentioned defects in the prior art, the present disclosure provides a method for identifying key elements that affect emergence of global efficiency of a rail transit system and a simulation system based on the evolution of intelligent group behaviors for implementing the method, thereby providing a systematic solution for the global efficiency improvement of the rail transit system, which can guide rail transit enterprises to make decisions.

The first technical solutions of the disclosure are described as follows.

The present disclosure provides a method for identifying key elements that affect emergence of global efficiency of a rail transit system, comprising:

determining the global efficiency of the rail transit system in form of an index vector;

around the index vector of the global efficiency of the rail transit system, establishing agent models of micro-subjects in the rail transit system and a simulation system of the emergence of the global efficiency based on evolution of intelligent group behaviors; and establishing an algorithm implemented in the simulation system to identify the key elements of the emergence of the global efficiency of the rail transit system; after the running of software codes carrying the algorithm is finished, identifying the key elements by the simulation system according to a mapping relationship between an optimal global efficiency and adjustable input parameters of the rail transit system.

In an embodiment, the global efficiency of the rail transit system is defined in the form of an index vector, as shown in equation (1):

$$e_{Efficiency} = \left[e_{EnergyEfficiency}\overline{R}\frac{N_{Actual}}{N} \times 100\% \frac{\overline{t}^{New}}{\overline{t}^{Old}} \times 100\%\right]^T; \quad (1)$$

wherein $\overline{R}$ is an average load ratio of passenger/cargo trains; $N_{Actual}$ is an actual number of the passenger/cargo trains running in a day in the rail transit system; N is the number of trains allowed to run in a day; $\overline{t}^{New}$ is an average running time of the passenger/cargo trains after equipment update, technological transformation, system upgrade or improvement of organization and management of the rail transit system; $\overline{t}^{Old}$ is an average running time of the passenger/cargo trains of a previous rail transit system; and $e_{EnergyEfficiency}$ is a weight of cargo or the number of people carried by the passenger/cargo trains and the travel distance of the passenger/cargo trains in the rail transit system per unit of energy consumption within a preset time period.

In an embodiment, the index vector of the global efficiency of the rail transit system is determined according to equation (1), in which the global energy efficiency $e_{EnergyEfficiency}$ is calculated according to equation (2):

$$e_{EnergyEfficiency} = \frac{N^A \times D^A}{E}; \quad (2)$$

wherein E is a total energy consumption of the rail transit system to complete the passenger/cargo transportation tasks; $N^A$ is an actual total number of passengers or a total weight of cargos that have been transported; and $D^A$ is an actual total travel distance of the passenger/cargo trains.

The local efficiency and energy efficiency of the rail transit system are respectively defined as equations (1) and (2), but different from the global efficiency and energy efficiency in the scale of research view, the latter includes such local efficiency and energy efficiency as the efficiency and energy efficiency of the control sub-centers, lines, stations and trains.

In an embodiment, the agent models of the micro-subjects in the rail transit system and the simulation system of the emergence of the global efficiency based on the evolution of intelligent group behaviors are established through steps of:

establishing a general agent model of the micro-subjects with intelligent perception, communication and behavior autonomy and collaboration abilities, to simulate actual behaviors of the micro-subjects in the rail transit system, such as a control center, control sub-centers, lines, stations and trains;

establishing a specific mathematical model of the behaviors of the micro-subjects according to duties, attributes, functions and performances of the micro-subjects; and generating a control center agent, control sub-center agents, line agents, station agents and train agents by using the established general agent model, then generating specific virtual entities to establish the simulation system of the emergence of the global efficiency based on the evolution of intelligent group behaviors;

wherein the algorithm of identifying the key elements of the emergence of the global efficiency of the rail transit system is a component of the simulation system of the emergence of the global efficiency based on the evolution of intelligent group behaviors.

In an embodiment, the mathematical model of the behavior of each micro-subject is expressed as equation (3):

$$B_{i,j}^{k_{i,j}} = f_{k_{i,j}}(x_{i,j}^1, x_{i,j}^2, L, x_{i,j}^{n_{i,j}-1}, x_{i,j}^{n_{i,j}}) \quad (3);$$

wherein $B_{i,j}^{k_{i,j}}$ represents a behavior of the $k_{i,j}$ th micro-subject in the j th type of the i th category; $k_{i,j}$ is a serial number of the micro-subject in the j th type of the i th category; $x_{i,j}^1, x_{i,j}^2, L, x_{i,j}^{n_{i,j}-1}, x_{i,j}^{n_{i,j}}$ are the independent variable parameters of the micro-subjects in the j th type of the i th category; $n_{i,j}$ is a total number of the independent variable parameters of the micro-subjects in the j th type of the i th category; $f_{k_{i,j}}(x_{i,j}^1, x_{i,j}^2, L, x_{i,j}^{n_{i,j}-1}, x_{i,j}^{n_{i,j}})$ is a cluster of behavior functions, reflecting external perception, behavior autonomy and collaboration abilities of the $k_{i,j}$ th micro-subject; and in object-oriented models of the micro-subjects, all parameters and functions are classified into a Public type, a Protected type and a Private type according to their external visibility and privacy.

The key elements that affect the emergence of efficiency are mainly reflected in the performance optimization of infrastructure and the scientific application of infrastructure; wherein the performance optimization of infrastructure comprises the performance optimization of all equipment for train operation and all auxiliary equipment for passenger/cargo transportation in good service (e.g. the elevators/escalators, food and beverage, entertainment, the environmental control equipment, etc.) in the rail transit system; the scientific application of infrastructure is mainly reflected in an advanced level of train control and transportation organization, which is related to a technical level and an application level of train control and transportation organization. The performance optimization of the infrastructure can create good conditions for the scientific operation of the infrastructure and the improvement of the global efficiency; when the performance of the infrastructure is determined, the improvement of the global efficiency mainly depends on the scientific application of the infrastructure. Whether in the performance optimization of the infrastructure or the scientific application of the infrastructure, it is ultimately necessary to realize the emergence of the global efficiency of the rail transit system through the autonomous behaviors and mutual cooperation of the micro-subjects such as the control center, control sub-centers, stations, and trains.

In the micro-subject behavior model of the control center, control sub-centers, lines, stations and trains, the value ranges of the parameters $x_{i,j}^1, x_{i,j}^2, L, x_{i,j}^{n_{i,j}-1}, x_{i,j}^{n_{i,j}}$ are closely related to their performances, and the performance optimization of infrastructure can only be achieved within the value ranges of the independent variable parameters of each micro-subject behavior, so as to establish a close connection with the scientific application of infrastructure, where $B_{i,j}^{k_{i,j}}$ comprehensively reflects the performance status and local application level of each micro-subject.

In an embodiment, a mathematical model of the emergence of the global efficiency of the rail transit system is expressed as equation (4):

$$e_{Efficiency} = g\left(\bigcup_{i=1,j=1}^{i=m,j=n_i}\left(\bigcup_{k_{i,j}=1}^{M_{i,j}} B_{i,j}^{k_{i,j}}\right)\right), \text{ s.t. } C = \{c_1, c_2, L, c_N\}; \quad (4)$$

wherein $M_{i,j}$ is a total number of the micro-subjects in the j th type of the i th category; m is a total number of categories of the micro-subject; $n_i$ is a total number of the micro-subjects in a type of the i th category; U represents the non-linear cooperative relationship among the micro-subjects; wherein the micro-subjects with the same category are in parallel cooperation, and the micro-subjects with different categories are in master-slave cooperation; $c_1, c_2, L, c_N$ are external constraints of the micro-subjects in collaboration; N is a total number of the external constraints; and $$g\left( \bigcup_{i=1,j=1}^{i=m,j=n_i} \left( \bigcup_{k_{i,j}=1}^{M_{i,j}} B_{i,j}^{k_{i,j}} \right) \right)$$

denotes the behavior function of the rail transit system.

In an embodiment, the step of identifying the key elements based on the algorithm comprises:

initializing or adjusting input parameters;

performing simulation calculations and a serialized evaluation of efficiency indicators by the simulation system of the emergence of the global efficiency based on the evolution of intelligent group behaviors after the initialization of the input parameters, to obtain the global efficiency and local efficiencies; and determining whether the obtained global efficiency is optimal;

if yes, activating an output unit to output the optimal global efficiency, and identifying the key elements according to the mapping relationship between the optimal global efficiency and the adjustable input parameters;

otherwise, adjusting the adjustable input parameters to circulate the simulation calculations until an acceptable optimal solution of the global efficiency is obtained to identify the key elements.

In an embodiment, after the key elements are identified according to the mapping relationship between the optimal global efficiency and the adjustable input parameters, the subsequent steps of the algorithm further comprise:

determining a percentage improvement of each indicator in the index vector of the global efficiency, a percentage improvement of each indicator in the index vector of each local efficiency, and the efficiency improvement measures corresponding to the key elements, thereby determining a systematic solution to improve the global efficiency.

The second technical solutions of the disclosure are described as follows.

The present disclosure provides a simulation system of the emergence of the global efficiency based on the evolution of intelligent group behaviors to implement the method of identifying key elements. The simulation system is established based on an organization and management architecture of the rail transit system and any one of the above-mentioned methods for identifying key elements that affect the emergence of the global efficiency of the rail transit system, wherein the simulation system is a software-hardware integrated computer virtual reality system capable of simulating the emergence process of the global efficiency of the rail transit system; micro-subjects, road network environment of train operation, spatio-temporal distribution of passenger and cargo flows, and an algorithm for identifying the key elements of the emergence of the global efficiency are established by software programming; and operation scenarios of a real rail transit system and the global efficiency in various complex situations are simulated and deduced on a computer display terminal; wherein the simulation system comprises:

a computer system of a control center for simulating a function of the control center; wherein a data center or a server, a plurality of computer input terminals and a plurality of display terminals with different sizes are externally connected to the computer system of the control center, so as to obtain the optimal global efficiency of the rail transit system through simulation, and screen on demand and observe in real time efficiency simulation of the control center, control sub-centers, lines, stations and trains;

a plurality of computer systems of control sub-centers for simulating functions of the control sub-centers; wherein a data center or a server, a plurality of computer input terminals and a plurality of display terminals with different sizes are externally connected to the computer system of each control sub-center, so as to obtain a global efficiency status of the control sub-centers through simulation, and screen on demand and observe in real time the efficiency simulation of the control sub-centers, lines, stations and trains; wherein the number of the computer systems of control sub-centers is the same as that of the control sub-centers in the road network; and a plurality of line computer systems for generating virtual entities of the stations and the trains, and simulating real situation of the lines; wherein a data center or a server, a plurality of computer input terminals and a plurality of display terminals with different sizes are externally connected to each line computer system, so as to obtain the an efficiency status of the lines through simulation, and screen on demand and observe in real time the efficiency simulation of the lines, stations and trains; wherein the number of the line computer systems is equal to the number of the lines in the road network; the number of the virtual stations is equal to the number of the stations in the road network; and lengths, running routes and the number of virtual trains are determined according to spatio-temporal distribution of passenger and cargo flows and transportation organization levels;

wherein the virtual entities of the micro-subjects such as the control center, the control sub-centers, the lines, the stations and the trains in the simulation system of the emergence of the global efficiency are generated by using the agent models; the road network environment of train operation and the spatial-temporal distribution of the passenger and cargo flows are established by setting the parameters of the virtual entities of the lines, the stations and the trains; each of the micro-subjects, the operating environment of the road network, the spatial-temporal distribution of passenger and cargo flows, and the algorithm for identifying the key elements of the emergence of the global efficiency are all realized by using software codes and virtual reality technology, and the real operation scenarios and the global efficiency of the rail transit system under various complex situations are simulated and deduced by the simulation system on the computer display terminals, wherein the virtual entities of the trains are the autonomous agents with position mobility, which endows a dynamic characteristic to the road network environment of train operation and the spatial-temporal distribution of passenger and cargo flows;

the master-slave and parallel cooperation relationships between the virtual entities are established on network communication such as Internet, enterprise intranet, local area network, mobile communication network or combinations thereof; the virtual entities generated by the established agent models of the micro-subjects such as the control center, the control sub-centers, the lines, the stations and the trains cooperate with each other through their respective communication modules, perception modules and behavior modules; and a subordination relationship of the line-switching train is switched through cooperation of the relevant line computer systems during the line-switching operation of the train; and the algorithm for identifying the key elements that affect the emergence of the global efficiency of the rail transit system is a component of the simulation system of the emergence of the global efficiency, wherein the software codes adopts distributed storage and run concurrently, and performs management and dispatching according to the organization and management architecture of rail transit enterprises; a percentage improvement of each indicator in the index vector of the global efficiency, a percentage improvement of each indicator in the index vector of each local efficiency, and the efficiency improvement measures corresponding to the key elements are determined through an evaluation and an optimization of the global efficiency and an identification process of the key elements, thereby determining a systematic solution to improve the global efficiency.

Compared to the prior art, the present disclosure has the following beneficial effects.

The present disclosure provides a method for identifying key elements that affect the emergence of the global efficiency of a rail transit system and a simulation system of the emergence of the global efficiency based on the evolution of intelligent group behaviors for implementing the method. In the method of identifying the key elements, an index vector of the global efficiency of the rail transit system is determined; around the index vector, the agent models of the micro-subjects in the rail transit system and a simulation system based on the evolution of intelligent group behaviors are established for the emergence of the global efficiency; and an algorithm is established and implemented in the simulation system to identify the key elements of the emergence of the global efficiency; after the running of software codes carrying the algorithm is finished, the key elements are identified by the simulation system according to a mapping relationship between an optimal global efficiency and adjustable input parameters of the rail transit system. At the same time, the percentage improvement of each indicator in the index vectors of the global efficiency and the percentage improvement of each indicator in the index vectors of each local efficiency are determined according to the organization and management architecture of the rail transit system, to guide the micro-subjects to cooperate with each other for the improvement of the global efficiency. Therefore, the method for identifying the key elements that affect the emergence of the global efficiency of the rail transit system can be implemented by the simulation system of the emergence of global efficiency to provide or help to find a systematic solution for the improvement of the global efficiency of the rail transit system, which guides rail transit enterprises to make decisions.

BRIEF DESCRIPTION OF THE DRAWINGS

As a part of the description, the accompanying drawings are intended to facilitate the understanding of the present disclosure. The accompanying drawings are intended to illustrate the present disclosure with reference to the embodiments and are not intended to limit the scope of the present disclosure. In the drawings.

DETAILED DESCRIPTION OF EMBODIMENTS

Technical solutions in one or more embodiments of the present disclosure will be described clearly and completely in conjunction with the accompanying drawings. The described embodiments are only a part of the embodiments of the present disclosure. Based on the embodiments of the present disclosure, all other embodiments obtained by those skilled in the art without making creative efforts fall within the protection scope of the present disclosure.

Embodiment 1

Figure 1:
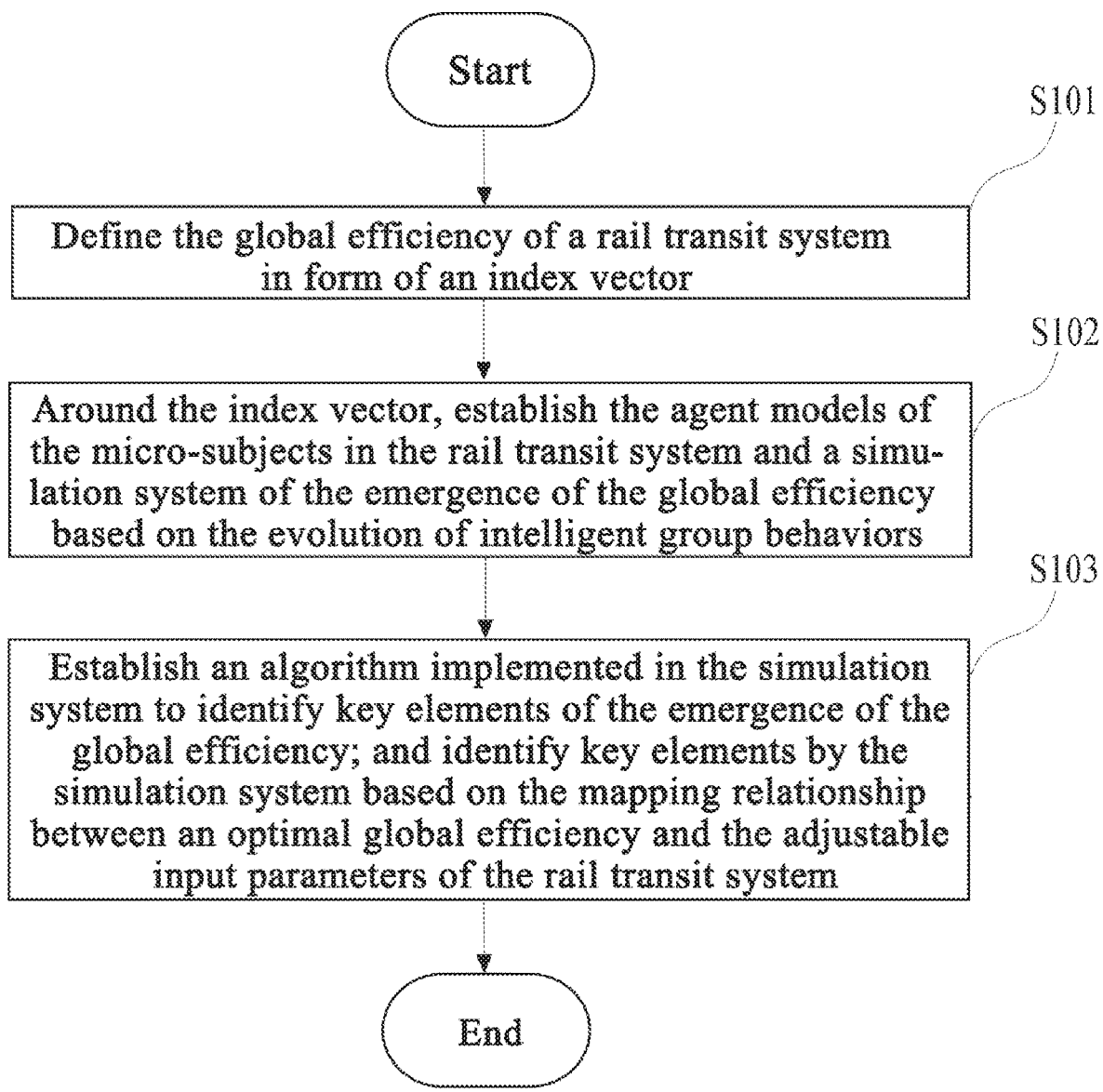
FIG. 1 is a flow chart of a method for identifying key elements that affect emergence of global efficiency of a rail transit system according to a first embodiment of the present disclosure.

FIG. 1 is a flow chart of a method for identifying key elements that affect emergence of global efficiency of a rail transit system according to a first embodiment of the present disclosure.

The embodiment provides a method of identifying key elements that affect the emergence of the global efficiency of a rail transit system, including the following steps.

S101) The global efficiency of the rail transit system is defined in form of an index vector.

S102) Around the index vector, the agent models of micro-subjects in the rail transit system and a simulation system of the emergence of the global efficiency based on the evolution of intelligent group behaviors are established.

S103) An algorithm implemented in the simulation system is established to identify the key elements of the emergence of the global efficiency.

Compared to the prior art, the method of identifying key elements that affect the emergence of the global efficiency of the rail transit system in the embodiment is implemented by establishing a simulation system of the emergence of the global efficiency based on the evolution of intelligent group behaviors. The simulation system of the emergence of the global efficiency adopts virtual reality technology to simulate the real operating scenarios of the rail transit system, and realize the evaluation and optimization of the global efficiency of the rail transit system, so as to provide a systematic solution for the improvement of the global efficiency of the rail transit system, which can guide rail transit enterprises to make decisions.

Embodiment 2

The embodiment provides a method of identifying key elements that affect the emergence of the global efficiency of a rail transit system, including the following steps.

S201) An index vector of the global efficiency of the rail transit system is determined for the improvement of the global efficiency.

Specifically, the index vector $e_{Efficiency}$ is calculated according to equation (1):

$$e_{Efficiency} = \left[ e_{EnergyEfficiency} \overline{R} \frac{N_{Actual}}{N} \times 100\% \frac{\bar{t}^{New}}{\bar{t}^{Old}} \times 100\% \right]^T; \quad (1)$$

where $\overline{R}$ is the average load ratio of passenger/cargo trains; $N_{Actual}$ is the actual number of the passenger/cargo trains running in a day in the rail transit system; N is the number of trains allowed to run in a day; $\bar{t}^{New}$ is the average running time of the passenger/cargo trains after equipment update, technological transformation, system upgrade or improvement of organization and management of the rail transit system; $\bar{t}^{Old}$ is the average running time of the passenger/cargo trains of a previous rail transit system; $e_{EnergyEfficiency}$ is the weight of cargo or the number of people and the travel distance of the rail transit system per unit of energy consumption within a preset time period.

Specifically, $e_{EnergyEfficiency}$ is calculated according to equation (2):

$$e_{EnergyEfficiency} = \frac{N^A \times D^A}{E}; \quad (2)$$

where E is the total energy consumption of the rail transit system to complete the passenger/cargo transportation tasks; $N^A$ is the actual total number of passengers or the total weight of cargo that have been transported; and $D^A$ is the actual total travel distance of the passenger/cargo trains.

S202) Around the index vector, the agent models of the micro-subjects in the rail transit system and a simulation system of the emergence of the global efficiency based on the evolution of intelligent group behaviors are established.

Specifically, the agent models of the micro-subjects in the rail transit system and the simulation system of the emergence of the global efficiency are established through the following steps.

Figure 2:
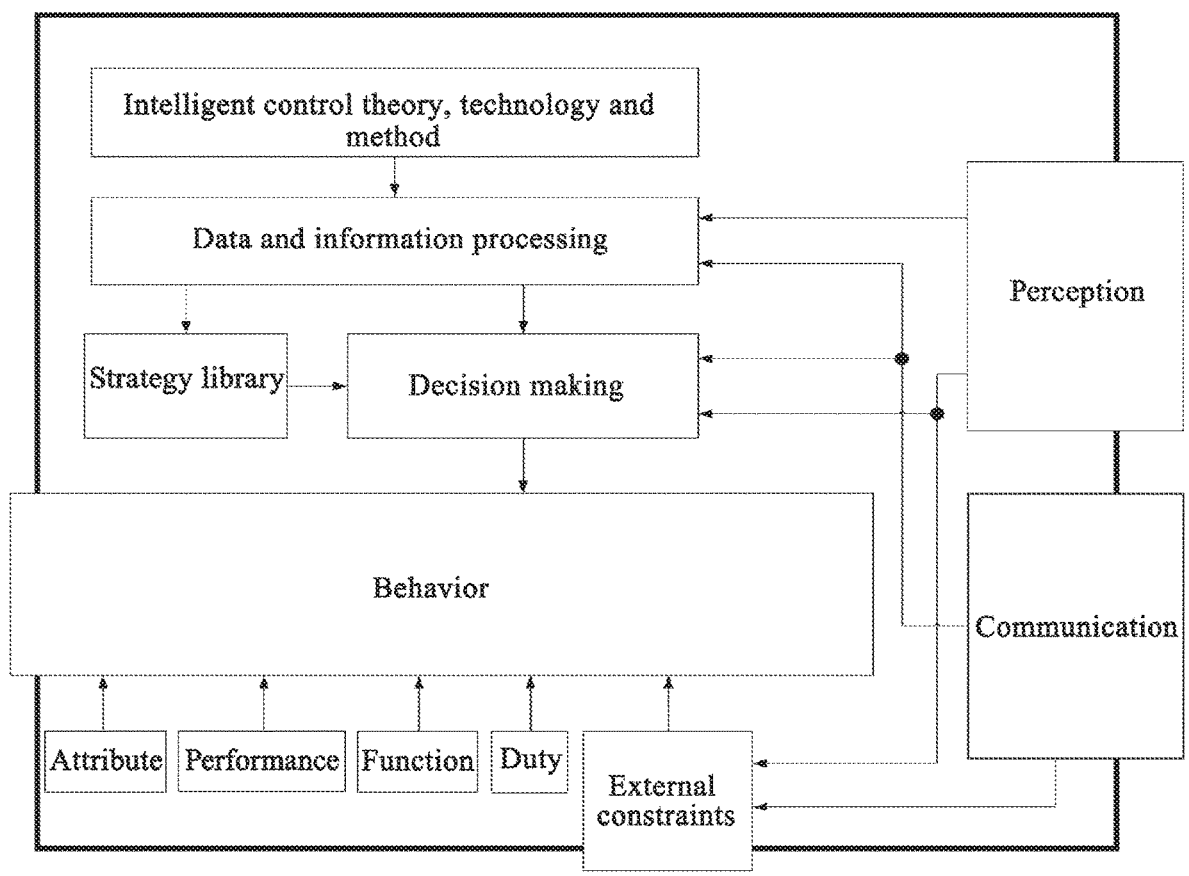
FIG. 2 shows a general agent model of micro-subjects of the rail transit system according to a second embodiment of the present disclosure.

As shown in FIG. 2, a general agent model of the micro-subjects with intelligent perception, communication and behavior autonomy and collaboration abilities is established to simulate the real behaviors of the micro-subjects in the rail transit system, such as a control center, a plurality of control sub-centers, a plurality of lines, a plurality of stations and a plurality of trains.

A specific mathematical model of the behavior of each micro-subject is established according to responsibilities, attributes, functions and performances of the micro-subjects.

A control center agent, a plurality of control sub-center agents, a plurality of line agents, a plurality of station agents and a plurality of train agents are generated by using the established general agent model, then the specific virtual entities are generated to simulate the behaviors of the control center, control sub-centers, lines, stations and trains, thereby establishing the simulation system of the emergence of the global efficiency based on the evolution of intelligent group behaviors by using the virtual entities.

The algorithm is a component of the simulation system of the emergence of the global efficiency.

Figure 3:
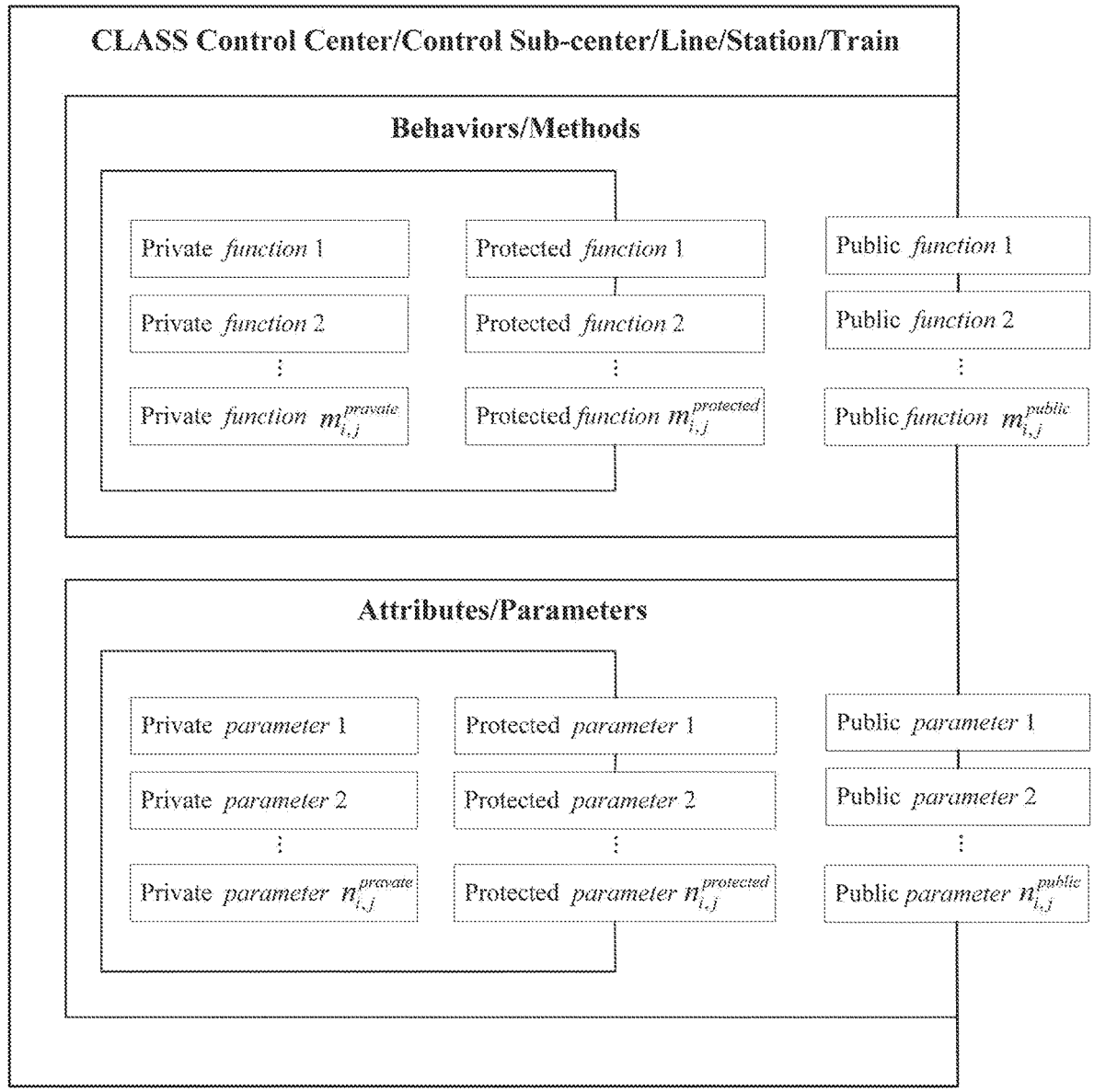
FIG. 3 shows an object-oriented model of the micro-subjects of the rail transit system according to the second embodiment of the present disclosure.

Specifically, the mathematical model of the behavior of each micro-subject is expressed as equation (3):

$$B_{i,j}^{k_{i,j}} = f_{k_{i,j}}(x_{i,j}^1, x_{i,j}^2, L, x_{i,j}^{n_{i,j}-1}, x_{i,j}^{n_{i,j}}) \quad (3);$$

where $B_{i,j}^{k_{i,j}}$ represents the behavior of the $k_{i,j}$ th micro-subjects in the j th type of the i th category and; $k_{i,j}$ is the serial number of the micro-subjects in the j th type of the i th category; $x_{i,j}^1$, $x_{i,j}^2$, L, $x_{i,j}^{n_{i,j}-1}$, $x_{i,j}^{n_{i,j}}$ are independent variable parameters of the micro-subjects in the j th type of the i th category; $n_{i,j}$ is the total number of the independent variable parameters of the micro-subjects in the j th type of the i th category; $f_{k_{i,j}}(x_{i,j}^1, x_{i,j}^2, L, x_{i,j}^{n_{i,j}-1}, x_{i,j}^{n_{i,j}})$ is a cluster of behavior functions, reflecting the external perception, behavior autonomy and collaboration abilities of the $k_{i,j}$ th micro-subject. As shown in FIG. 3, all parameters and functions are classified into a Public type, a Protected type and a Private type according to their external visibility and privacy.

Figure 4:
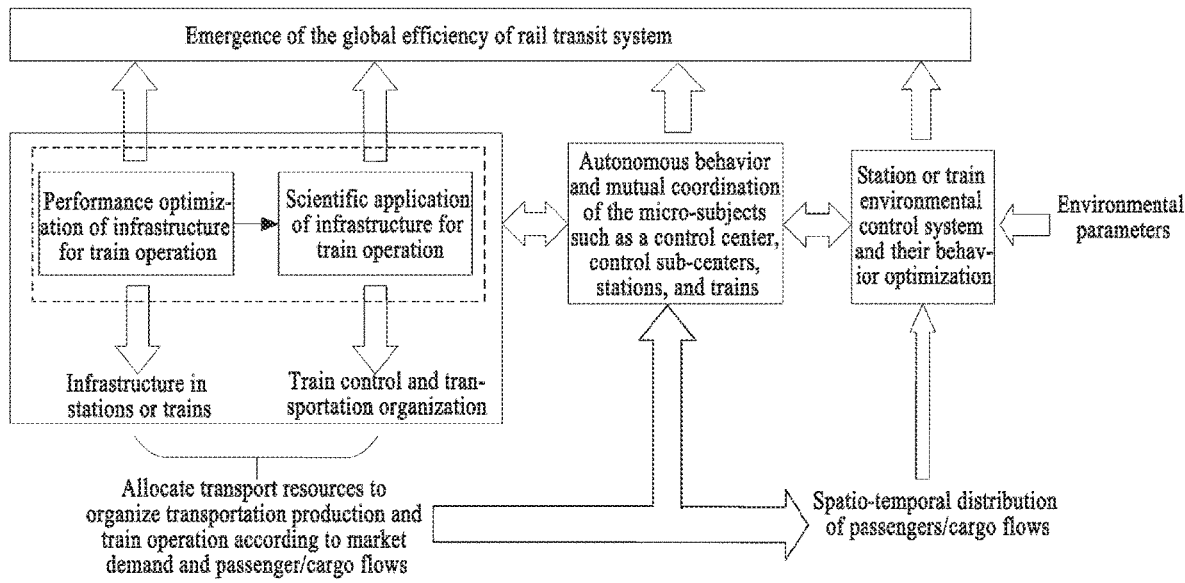
FIG. 4 shows a model of the emergence of the global efficiency of the rail transit system according to the second embodiment of the present disclosure.

The key elements that affect the emergence of efficiency are mainly reflected in the performance optimization of infrastructure and the scientific application of infrastructure. The performance optimization of the infrastructure can create good conditions for the scientific operation of the infrastructure and the improvement of the global efficiency; when the performance of the infrastructure is determined, the improvement of the global efficiency mainly depends on the scientific application of the infrastructure. Whether in the performance optimization of the infrastructure or the scientific application of the infrastructure, it is ultimately necessary to realize the emergence of the global efficiency of the rail transit system through the autonomous behaviors and mutual cooperation of the control center, control sub-centers, stations, and trains of the micro-subjects, as shown in FIG. 4.

In the micro-subject behavior models of the control center, control sub-centers, lines, stations and trains, value ranges of the parameters $x_{i,j}^1$, $x_{i,j}^2$, L, $x_{i,j}^{n_{i,j}-1}$, $x_{i,j}^{n_{i,j}}$ are closely related to their performances, and the performance optimization of infrastructure can only be achieved within the value ranges of the independent variable parameters of each micro-subject behavior, so as to establish a close connection with the scientific application of infrastructure, where $B_{i,j}^{k_{i,j}}$ comprehensively reflects the performance status and local application level of each micro-subject.

Specifically, a mathematical model of the emergence of the global efficiency of the rail transit system is expressed as equation (4):

$$e_{Efficiency} = g\left( \bigcup_{i=1,j=1}^{i=m,j=n_i} \left( \bigcup_{k_{i,j}=1}^{M_{i,j}} B_{i,j}^{k_{i,j}} \right) \right), \text{ s.t. } C = \{c_1, c_2, L, c_N\}; \quad (4)$$

where $M_{i,j}$ is the total number of the micro-subjects in the j th type of the i th category; m is the total number of categories of micro-subjects; $n_i$ is the total number of the micro-subjects in the type of the i th category; U represents the non-linear cooperative relationship among the micro-subjects. The micro-subjects with the same category are in parallel cooperation, and the micro-subjects with different categories are in master-slave cooperation; $c_1$, $c_2$, L, $c_N$ are the external constraints of the micro-subjects in collaboration; N is the total number of the external constraints; and $$g\left(\bigcup_{i=1,j=1}^{i=m,j=n_i}\left(\bigcup_{k_{i,j}=1}^{M_{i,j}} B_{i,j}^{k_{i,j}}\right)\right)$$

denotes the behavior function of the rail transit system.

S203) An algorithm implemented in the simulation system is established to identify key elements of the emergence of the global efficiency. After the running of software codes carrying the algorithm is finished, the key elements are identified by the simulation system according to a mapping relationship between an optimal global efficiency and adjustable input parameters of the rail transit system.

Specifically, the method of identifying key elements based on the algorithm includes the following steps.

Input parameters are initialized or adjusted.

Simulation calculations and a serialized evaluation of efficiency indicators are performed by the simulation system of the emergence of the global efficiency after the initialization of the input parameters, to obtain a global efficiency and local efficiencies.

Whether the currently obtained global efficiency is optimal is determined;

if yes, an output unit is activated to output the optimal global efficiency, and the key elements are identified according to the mapping relationship between the optimal global efficiency and the adjustable input parameters;

otherwise, the adjustable input parameters are adjusted, and the simulation calculations are circulated until an acceptable optimal solution of the global efficiency is obtained to identify the key elements.

Specifically, termination conditions of the calculation and optimization process for obtaining the optimal global efficiency are as follows:

(1) the number of cycles reaches a preset maximum number of cycles; and (2) after cyclic simulation for a certain number of times, the values of the global efficiency obtained continuously are within a specified error range.

One of the above-mentioned conditions is required to end the calculation and optimization process of the algorithm for identifying key elements.

Specifically, after the key elements are identified according to the mapping relationship between the optimal global efficiency and the adjustable input parameters, a percentage improvement of each indicator in the index vector of the global efficiency, a percentage improvement of each indicator in the index vector of each local efficiency, and the efficiency improvement measures corresponding to the key elements are determined, thereby determining a systematic solution to improve the global efficiency.

Specifically, all input parameters related to the global efficiency improvement can be divided into adjustable input parameters and non-adjustable input parameters, where the input parameters involve network topology, line conditions, train parameters, environmental control system parameters, spatio-temporal distribution of passenger flow, global efficiency, local efficiencies, and other parameters necessary for the algorithm.

The simulation calculations and a serialized evaluation of efficiency indicators are performed by the simulation system of the emergence of the global efficiency after the initialization of the input parameters to obtain a global efficiency and local efficiencies, and simultaneously solve the problem that matrix norm cannot be applied to the optimization of the global efficiency.

As far as the utilization of the road network or line transportation capacity is concerned, the serialized global efficiency evaluation process in the off season of transportation is obviously different from that in the peak season of transportation. In the off season of transportation, the global efficiency cannot be improved by fully utilizing the transportation capacity; but in the peak season of transportation, the full utilization of transportation capacity is one of the necessary conditions for efficiency improvement. The serialized global efficiency evaluation process is flexible and can be adjusted according to the main contradictions that need to be resolved for efficiency improvement.

After the key elements are identified, the efficiency improvement measures corresponding to the key elements are determined according to the mapping relationship between the optimal global efficiency and the adjustable input parameters, thereby the systematic solution for improving the global efficiency is determined.

Specifically, FIG. 2 shows a general agent model of the micro-subjects of the rail transit system according to the second embodiment of the present disclosure, the behavior of each micro-subject is described by a mathematical model shown in equation (3) and implemented with an object-oriented model for software programming as shown in FIG. 3. FIG. 3 shows an object-oriented model of the micro-subjects of the rail transit system according to the second embodiment of the present disclosure, where "Attributes/Parameters" refer to the independent variable parameters of the micro-subject behaviors that reflect the behavioral attributes of the micro-subjects, "Behaviors/Methods" refer to the behavioral functions of the micro-subjects and the specific methods to deal with various problems, "Public, Private and Protected" are used to characterize visibility and privacy of each parameter and each function. $m_{i,j}^{public}$, $m_{i,j}^{protected}$, $m_{i,j}^{private}$ respectively represent the number of functions with three characteristics, and $n_{i,j}^{public}$, $n_{i,j}^{protected}$, $n_{i,j}^{private}$ respectively represent the number of parameters with three characteristics.

FIG. 4 shows a model of the emergence of the global efficiency of the rail transit system according to the second embodiment of the present disclosure, where the performance optimization of infrastructure includes the performance optimization of station equipment for train operation, trains, environmental control systems, regenerative energy systems and traction systems. The scientific application of infrastructure is reflected in the advancement of train control technology, transportation organization management and their application levels. In the micro-subject behavior models of the control center, control sub-centers, lines, stations and trains, the value ranges of parameters $x_{i,j}^1$, $x_{i,j}^2$, L, $x_{i,j}^{n_{i,j}-1}$, $x_{i,j}^{n_{i,j}}$ are closely related to their performance, thereby creating good conditions for the scientific application of infrastructure, because the performance optimization of infrastructure can only be achieved within the value ranges of the independent variable parameters of each micro-subject behavior.

Figure 5:
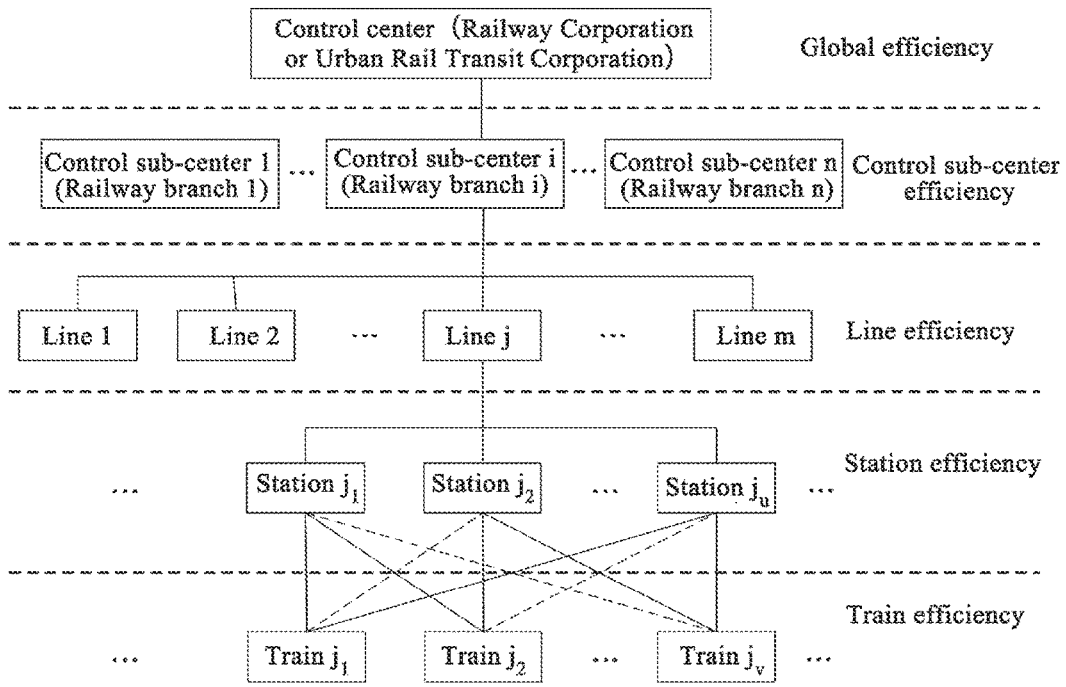
FIG. 5 shows an organization and management architecture of the rail transit system for the hierarchical cooperation of micro-subjects according to the second embodiment of the present disclosure.

FIG. 4 describes a mechanism of the emergence of the global efficiency of the rail transit system with the service-oriented business idea in passenger/cargo transportation, where the emergence of the global efficiency is taken as the common optimization goal by the micro-subjects, such as the control center, the control sub-centers, the lines, the stations and the trains; and all micro-subjects cooperate with each other according to the hierarchical organization and management architecture of rail transit companies shown in FIG. 5. FIG. 5 describes the organization and management architecture of the rail transit system with the hierarchical cooperation of micro-subjects according to the second embodiment of the present disclosure, where there is a parallel collaboration relationship between the micro-subjects at the same level, and a master-slave collaboration between the micro-subjects at the vertical adjacent levels. In the simulation system of the emergence of the global efficiency shown in FIG. 6, the cooperation relationships mentioned above will be established by the virtual entities corresponding to the micro-subject of the rail transit system.

Figure 6:
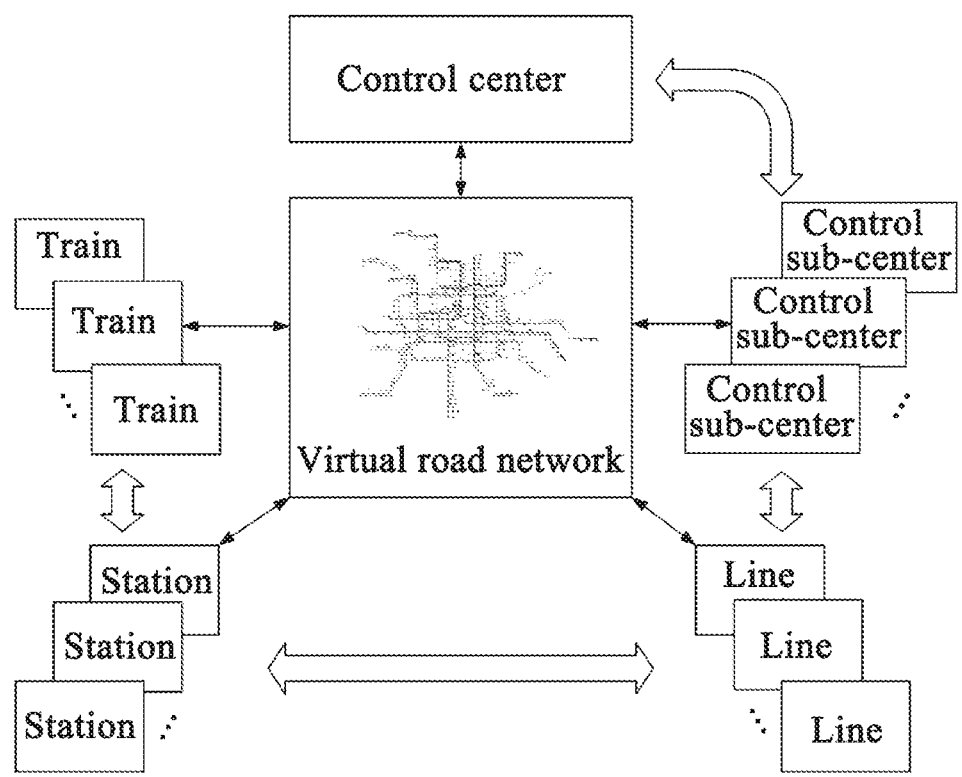
FIG. 6 shows a simulation system of the emergence of the global efficiency based on evolution of intelligent group behaviors according to the second embodiment of the present disclosure.

As shown in FIG. 6, according to the micro-subjects and their behavior models (as shown in FIGS. 2-3 and equation (3)), the organization and management architecture of the rail transit system (as shown in FIG. 5), and the model of the emergence of efficiency of the rail transit system (as shown in FIG. 4 and equation (4)), the simulation system of the emergence of the global efficiency based on the evolution of intelligent group behaviors is a large-scale hardware and software integrated computer network system, on which the virtual entities generated by using the agent models of the micro-subjects run to simulate the real situation of the rail transit system.

Figure 7:
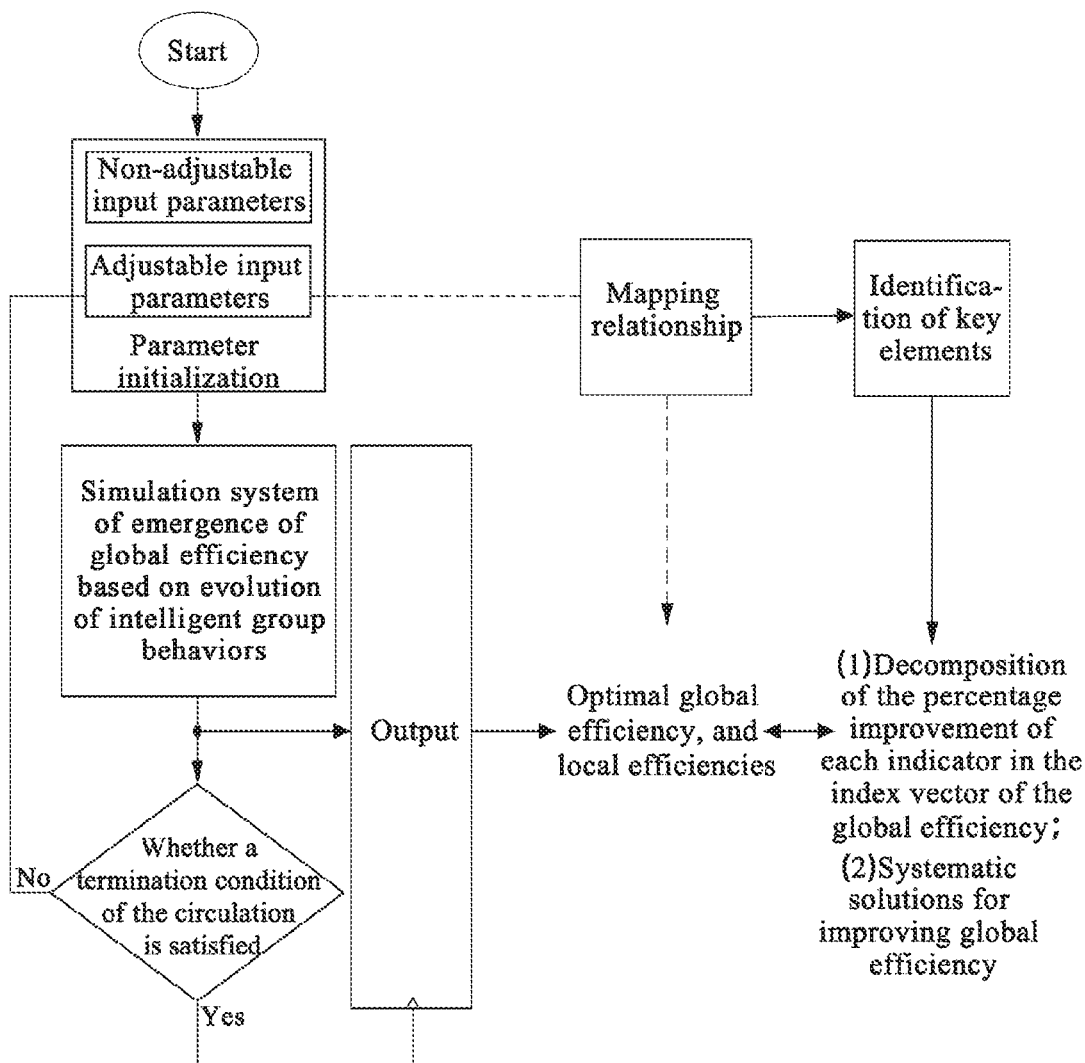
FIG. 7 shows an algorithm for identifying the key elements that affect the emergence of the global efficiency of the rail transit system according to the second embodiment of the present disclosure.

FIG. 7 shows an algorithm for identifying key elements that affect the emergence of the global efficiency of the rail transit system according to the second embodiment of the present disclosure. In the algorithm shown in FIG. 7, the global efficiency of the rail transit system needs to be evaluated according to FIG. 8 and FIG. 9.

Figure 8:
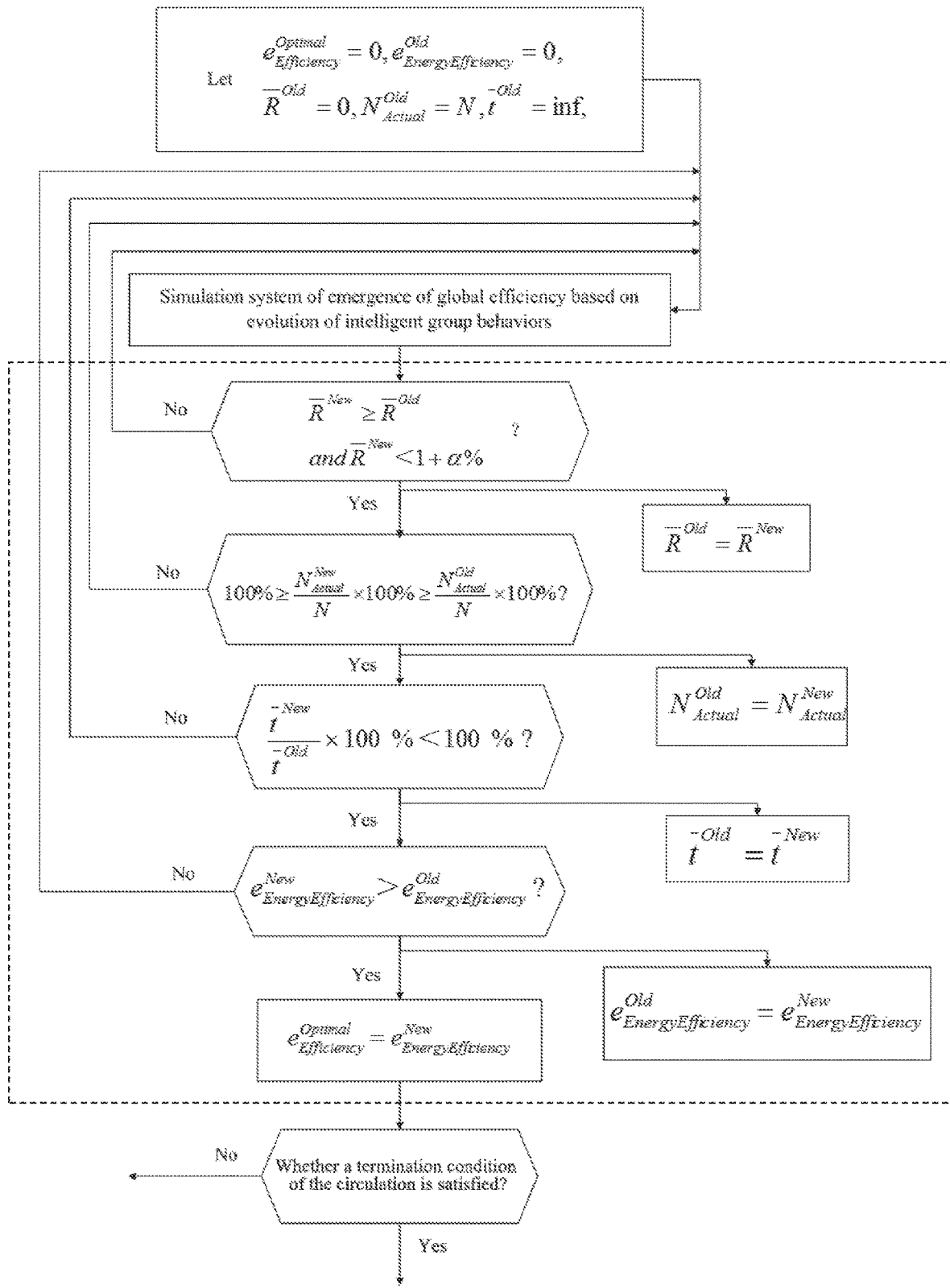
FIG. 8 is a flowchart of an evaluation of the global efficiency of the rail transit system during a peak season of transportation according to the second embodiment of the present disclosure.
Figure 9:
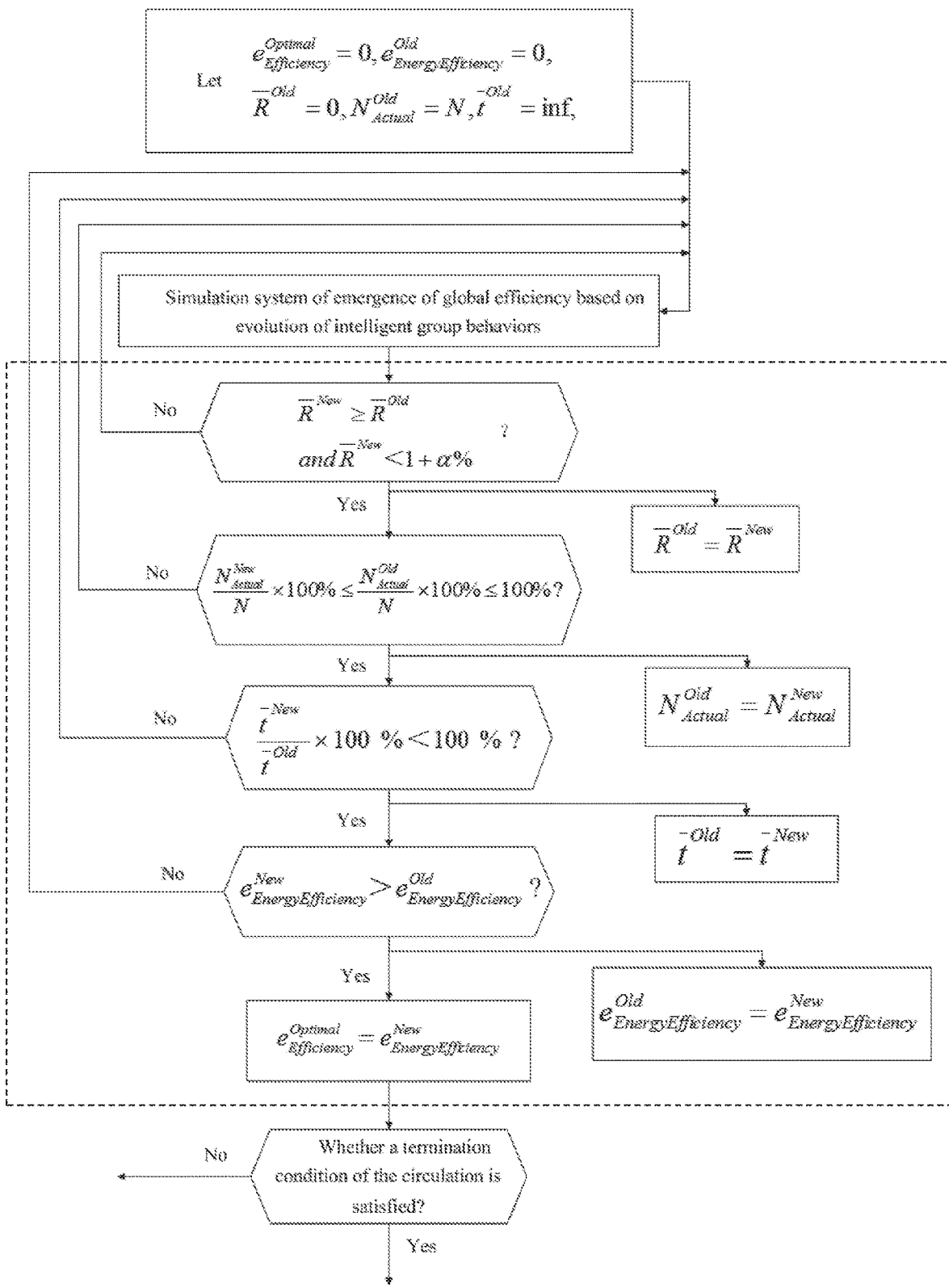
FIG. 9 is a flowchart of an evaluation of the global efficiency of the rail transit system during an off season of transportation in the second embodiment of the present disclosure.

Specifically, FIG. 8 is a flowchart of an evaluation of the global efficiency of the rail transit system during a peak season of transportation according to the second embodiment of the present disclosure; and FIG. 9 is a flowchart of an evaluation of the global efficiency of the rail transit system during an off season of transportation according to the second embodiment of the present disclosure, where the global efficiency of the rail transit system during the peak and off seasons of transportation are respectively evaluated according to the serialized evaluation process in the dotted box shown in FIGS. 8-9. As long as the global energy efficiency is improved when other efficiency indicators are better than the previous situation, it can be considered that the global efficiency has been improved.

FIGS. 8-9 respectively describe the serialized evaluation process in which energy efficiency is regarded as the main contradiction of efficiency improvement during the peak season of transportation and the off season of transportation. When the full utilization of transportation capacity, increase of the load ratio and improvement of rapidity are respectively the main contradiction of efficiency improvement, a similar treatment can be performed in the serialized evaluation process, or the indicators in the index vector of the efficiency are sorted according to their respective importance to the improvement of the global efficiency. After a current main contradiction is resolved, a corresponding indicator can be used as an invariant for reference to resolve a next main contradiction until all efficiency indicators are improved. $e_{Efficiency}^{Optimal}$ is the optimal global efficiency of a urban rail transit system; $e_{EnergyEfficiency}^{Old}$ is an initial value of the energy efficiency of the urban rail transit system; $\overline{R}^{Old}$ is an initial value of the average load ratio of the urban rail transit system; $N_{Actual}^{Old}$ is an initial value of the number of trains in the urban rail transit system, and $\overline{t}^{Old}$ is an average running time of the urban rail transit system and can be initialized to a large value for simulation. A new energy efficiency value $e_{EnergyEfficiency}^{New}$, a new average load ratio $\overline{R}^{New}$, a new number of running trains $N_{Actual}^{New}$ and a new average running time $\overline{t}^{New}$ are obtained in each simulation. $\alpha$ is a small positive number for the efficiency improvement of rail transit system during the peak season of passenger/cargo transportation, so that the overloading under certain limits is allowed when the number of in-service trains is insufficient.

In the method of identifying key elements that affect the emergence of the global efficiency of the rail transit system in the embodiment, the efficiency of the whole rail transit system is expressed as a vector, as shown in equation (1), where the dimensions of the efficiency indicators are different, and optimization directions of each parameter are not exactly the same (a better performance is obtained when some parameters have a larger value, but smaller value of the other parameters causes a better performance). Moreover, there are complex coupling relationships among the efficiency indicators. It is inappropriate to adopt $e_{Efficiency}^T e_{Efficiency}$ to study the optimization of the global efficiency of the rail transit system, otherwise the error of efficiency evaluation may become greater or the parameter(s) with smaller value(s) may be submerged. In order to solve this problem, the following methods are specifically adopted in the simulation algorithm for identifying key elements that affect the emergence of the global efficiency of the rail transit system in the embodiment.

FIGS. 8-9 respectively show the efficiency evaluations during the peak and off seasons of transportation.

Based on the ideas and methods of Pareto optimization, the efficiency optimization is transformed into the calculation and serialization evaluation process of each indicator in the index vector of the global efficiency, so that the global efficiency would be able to be characterized as the global energy efficiency if the values of other indicators in the index vector of the global efficiency are not worse than before. In the above case, as long as the global energy efficiency is improved under the condition that the values of other indicators in the index vector of the global efficiency are not worse than before, it can be considered that the global efficiency has been improved.

The above-mentioned evaluation and calculation process are all completed in a background of the simulation system of the emergence of the global efficiency based on the evolution of intelligent group behaviors.

In different transportation seasons, the heavy degrees of transportation tasks are different, and the demands for transportation capacity of the rail transit system are also different. In the peak season of transportation, the full utilization of transportation capacity helps to complete larger transportation tasks, so $$100\% \geq \frac{N_{Actual}^{New}}{N} \times 100\% \frac{N_{Actual}^{Old}}{N} \times 100\%$$

is considered as a judgment condition, that is, a larger number of trains are still required to complete a given transportation task on the basis of an increase in the average load ratio. In the off season of transportation, it is more efficient to complete another given transportation task with the least number of trains, so $$\frac{N_{Actual}^{New}}{N} \times 100\% \leq \frac{N_{Actual}^{Old}}{N} \times 100\% \leq 100\%$$

is adopted as the judgment condition.

Obviously, only when the average load ratio is the highest within an allowable range, the number of the trains is matched with the transportation task, and the average passenger/cargo arrival time is the least, the energy efficiency of the whole rail transit system is optimal, and its global efficiency is optimal. Therefore, in the process shown in FIGS. 8-9, a serialized evaluation method based on the idea of the Pareto optimization is adopted to transform the optimization of the global efficiency into optimization of global energy efficiency for simulation, where $e_{Efficiency}^{Optimal} = e_{EnergyEfficiency}^{Optimal}$.

When the main contradiction to be resolved for efficiency improvement becomes one of other indicators, a serialized evaluation process is performed according to a flowchart similar to FIGS. 8-9, where "the new efficiency indicator belonging to the main contradictory of improving the global efficiency and its evaluation methods" and "the energy efficiency indicators and its evaluation methods" are reversed in order; or all indicators in the index vector of the global efficiency are sorted according to their respective importance to the improvement of the global efficiency, then each indicator is evaluated and optimized in order of their importance. After a current main contradiction is resolved, the corresponding indicator can be used as an invariant for reference to resolve a next main contradiction until all efficiency indicators are improved.

Specifically, the method of identifying key elements that affect the emergence of the global efficiency of a rail transit system includes the following steps according to the embodiment of the present disclosure.

An index vector of the global efficiency of the rail transit system is determined, and the agent models of the micro-subjects in the rail transit system and a simulation system of the emergence of the global efficiency based on the evolution of intelligent group behaviors are established.

The input parameters are initialized or adjusted, where the initialization object includes the adjustable input parameters and non-adjustable input parameters, and only the adjustable input parameters can be adjusted for a new round of simulation calculation after the initialization of input parameter.

After the simulation calculation and the serialized evaluation of the efficiency indicators are performed using the simulation system of the emergence of the global efficiency, the global efficiency and each local efficiency are obtained. The two adjacent global efficiency in time are compared and analyzed, to retain the values of the adjustable input parameters and the simulation calculation results corresponding to higher global efficiency.

Whether the calculation and optimization process of the global efficiency achieves an expected goal is determined.

If yes, the global efficiency retained at last is the optimal global efficiency which can be accepted in engineering, and the percentage improvement of each indicator in the index vector of the global efficiency and the percentage improvement of each indicator of each local efficiency are determined, so that key elements are identified according to the mapping relationship between the adjustable input parameters and the optimal global efficiency, thereby determining the efficiency improvement measures of each local key element for the improvement of the global efficiency.

Otherwise, the adjustable input parameters are adjusted, and the calculation is circularly continued.

The method of identifying key elements that affect the emergence of the global efficiency of a rail transit system in the embodiment has the following beneficial effects.

1. The simulation system of the emergence of the global efficiency provided in the embodiment is established on the mechanism of the emergence of the global efficiency of the rail transit system with the spatio-temporal collaboration behaviors of various micro-subjects. Therefore, the internal connection between the macroscopic behaviors of the rail transit system and the behaviors of each micro-subject can be revealed through simulation deduction, thereby to discover the law of the emergence of the global efficiency of the rail transit system.

2. The key elements are identified through determining whether the global efficiency has been improved after the adjustable input parameters are adjusted. In different development stages of the rail transit system, such as planning, design, construction and operation, the value range and the number of adjustable input parameters are different. The global efficiency in each stage can be simulated by the established simulation system through reasonably adjusting the corresponding adjustable input parameters within their value range. Therefore, the method of identifying key elements in the embodiment can not only be applied to all links of transportation organization and train operation, but also cover the whole life cycle of the rail transit system after proper expansion, thereby improving the global efficiency of the rail transit system.

3. The input parameters in the present disclosure can be divided into non-adjustable input parameters and adjustable input parameters according to the characteristics of different development stages of the rail transit system, where there is a mapping relationship between the adjustable input parameters and the global efficiency. When the global efficiency is optimal, the mapping relationship can provide a decision-making basis for identifying the key elements and formulating specific measures to improve global efficiency. As shown in FIG. 7, provided is an algorithm for identifying key elements that affect the emergence of the global efficiency of the rail transit system according to the second embodiment of the present disclosure. Moreover, since the simulation system calculates and decomposes the global efficiency according to the organization and management architecture of the rail transit system, the systematic solution obtained by the simulation system has a strong performability.

4. The efficiency of the rail transit system is defined by a plurality of indicators. In order to reduce the error in evaluation or avoid ignoring the indicator with smaller values due to the difference of the efficiency indicators in optimization goals, optimization directions, and dimensions, the present disclosure adopts the serialized evaluation process of the efficiency indicators according to the different requirements of the transportation task during the peak and off seasons of transportation, so that the complex global efficiency evaluation is simplified to a problem of serialized evaluation of the efficiency indicators to be studied for the improvement of the global efficiency.

5. An output unit with an enable is provided in the simulation system in the present disclosure. When the simulation system obtains an acceptable optimal global efficiency, the global efficiency and each local efficiency are output, and the key elements are identified according to the mapping relationship between the output efficiency and the adjustable input parameters, thereby generating a systematic scheme of improving the global efficiency, and solving the problem of identifying key elements for the global efficiency improvement of the massive, nonlinear, and complex rail transit system.

Compared to the prior art, the method of identifying key elements that affect the emergence of the global efficiency of the rail transit system in the embodiment of the present disclosure clearly distinguishes the efficiency, energy efficiency and energy consumption, as shown in equation (1) and equation (2). The energy saving and efficiency increase of the rail transit systems are studied taking the "efficiency" with rich connotation as the optimization goal, thereby providing a systematic solution to reduce the global energy consumption and improve the global efficiency. As a result, more effective systematic solutions can be provided for the improvement of the global efficiency by well integrating energy saving with efficiency increase.

For a large and complex rail transit system, the steps of the above-mentioned method are used to clearly describe the relationship between efficiency emergence and efficiency improvement, as well as the method of identifying key elements that affect the emergence of the global efficiency. Any insignificant modification made to the algorithm or process, and insignificant designs introduced without changing the core design of the algorithm and process shall fall within the protection scope of the present disclosure.

Embodiment 3

This embodiment provides a simulation system of the emergence of the global efficiency based on the evolution of intelligent group behaviors to implement the method of identifying the key elements. The simulation system is configured by the software and hardware integrated computers connected with each other through network communication, where the virtual reality scenes of rail transit system can be established to simulate the emergence of the global efficiency. The simulation system is essentially an intelligent agent which can implement the method of identifying the key elements. The details that are not described thoroughly in this embodiment can be referred to the method of identifying the key elements in the above mentioned embodiment.

Figure 10:
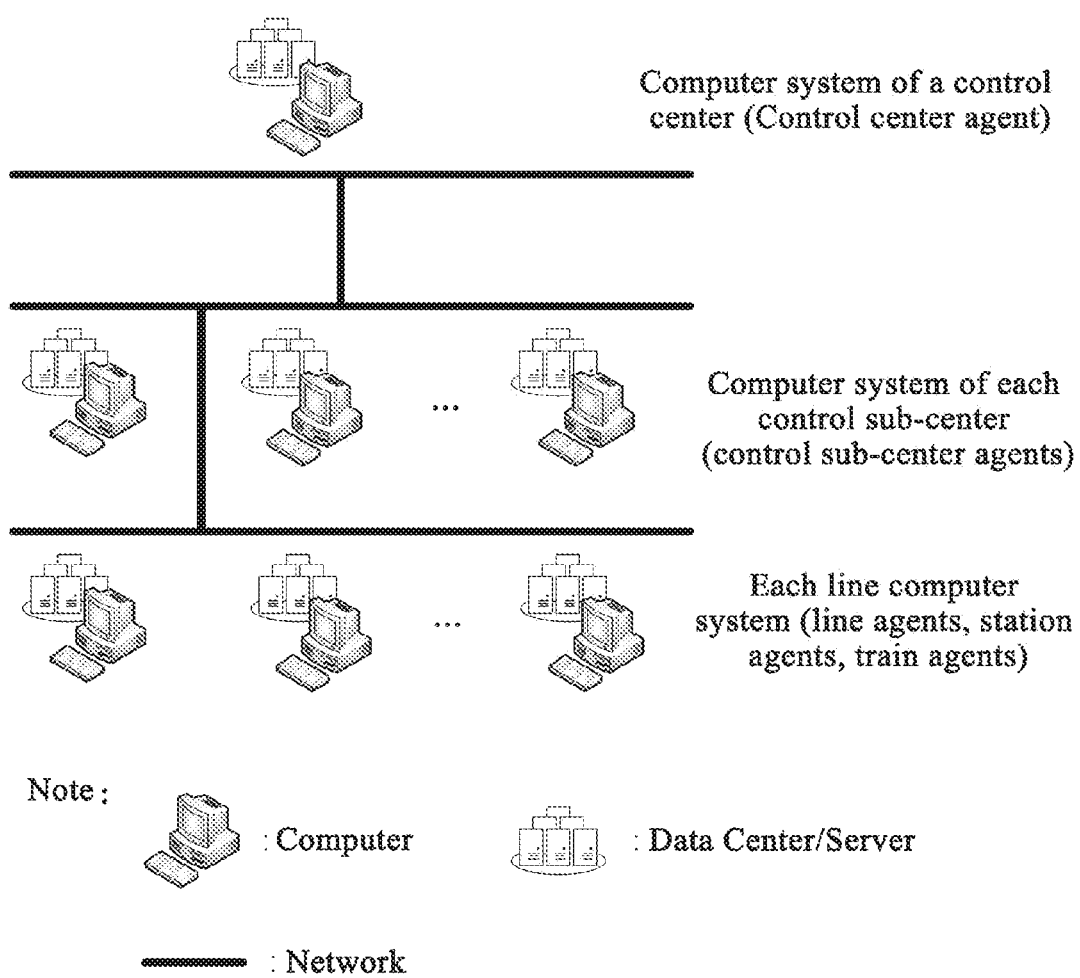
FIG. 10 shows the architecture of the simulation system of the emergence of the global efficiency based on the evolution of intelligent group behaviors for implementing the method for identifying the key elements according to a third embodiment of the present invention.

FIG. 6 shows a simulation system of the emergence of the global efficiency based on the evolution of intelligent group behaviors according to the second embodiment of the present disclosure; and FIG. 10 describes the architecture of the simulation system of the emergence of the global efficiency based on the evolution of intelligent group behaviors.

Based on the organization and management architecture of the rail transit system with a large number of micro-subjects shown in FIG. 5, a simulation system of the emergence of the global efficiency based on the evolution of intelligent group behaviors is established, where the simulation system (as shown in FIG. 6) includes the following parts.

A computer system of a control center for simulating the function of the control center, where a data center or a server, a plurality of computer input terminals and a plurality of display terminals with different sizes are externally connected to the computer system of the control center, so as to obtain the optimal global efficiency of the rail transit system through simulation, and screen on demand and observe in real time the efficiency simulation of the control center, control sub-centers, lines, stations and trains.

A plurality of computer systems of control sub-centers for simulating the functions of control sub-centers, where a data center or a server, a plurality of computer input terminals and a plurality of display terminals with different sizes are externally connected to the computer system of each control sub-center, so as to obtain the global efficiency of the control sub-centers through simulation, and screen on demand and observe in real time the efficiency simulation of the control sub-centers, lines, stations and trains. The number of the computer systems of control sub-centers is the same as that of the control sub-centers in the road network.

A plurality of line computer systems for generating the virtual entities of the stations and the trains, and simulating the real situation of the lines, where a data center or a server, a plurality of computer input terminals and a plurality of display terminals with different sizes are externally connected to each line computer system, so as to obtain the global efficiency of the lines through simulation, and screen on demand and observe in real time the efficiency simulation of the lines, stations and trains. The number of the line computer systems is equal to the number of the lines in the road network; the number of the virtual stations is equal to the number of the stations on the lines; and the lengths, running routes and the number of the virtual trains are determined according to the spatio-temporal distribution of passenger and cargo flows and transportation organization levels.

Specific the virtual entities of the micro-subjects including the control center, the control sub-centers, the lines, the stations and the trains in the simulation system of the emergence of the global efficiency are generated using the agent models. The road network environment of train operation and the spatial-temporal distribution of the passenger and cargo flows are established by setting the parameters of the virtual entities of the lines, the stations and the trains. The micro-subjects, the operating environment of the road network, the spatial-temporal distribution of the passenger and cargo flows and the algorithm for identifying key elements are all achieved using software codes and virtual reality technology, and the operation scenarios of the real rail transit system and the global efficiency of the rail transit system in various complex situations are simulated and deduced by the simulation system on its computer display terminal, where the virtual entity of each train is an autonomous agent with position mobility, which endows a dynamic characteristic to the road network environment of train operation and the spatial-temporal distribution of passenger and cargo flows.

The master-slave and parallel cooperation between two different computer systems are established on network communication including Internet, enterprise intranet, local area network, mobile communication network or combinations thereof; the virtual entities generated by the agent models, such as the control center, the control sub-centers, the lines, the stations and the trains, run on their respective computer systems, and the virtual entities are cooperated in master-slave or parallel through their respective communication modules, perception modules and behavior modules; and the subordination relationship of the line-switching train is switched through the cooperation of the relevant line computer systems during the line-switching operation of the train.

The algorithm (as shown in FIG. 7) for identifying key elements that affect the emergence of the global efficiency of the rail transit system is a component of the simulation system (as shown in FIG. 6) of the emergence of the global efficiency, where the software codes adopt distributed storage and run concurrently, and performs the management and dispatching based on the organization and management architecture of the rail transit system; the percentage improvement of each indicator in the index vector of the global efficiency, the percentage improvement of each indicator in the index vector of each local efficiency (i.e. a non-linear decomposition of the percentage improvement of each indicator in the index vector of the global efficiency), and the efficiency improvement measures corresponding to each local key element are determined through the evaluation and optimization of the global efficiency and the identification process of key elements, thereby determining a systematic solution to improve the global efficiency.

It should be noted that the technologies, methods and equipment known to those skilled in the related fields are not described in detail in the present disclosure, and the terms used in the present disclosure are intended to describe the specific implementations, but not to limit the exemplary implementations according to the present disclosure. The scope of the present disclosure is defined by the appended claims, and the technologies, methods, and equipment and systems that use the technologies and methods should be regarded as a part of the specification. It should be understood that any modification made by those skilled in the art without departing from the spirit of the present disclosure shall fall within the scope of the appended claims.

What is claimed is:

1. A computer-implemented method of simulating a rail transit system, comprising:
   a) determining, at a computer simulation system executed by a processor, a global efficiency of the rail transit system in form of an index vector;
   b) around the index vector, establishing, at the computer simulation system executed by the processor, agent models of micro-subjects in the rail transit system to simulate an emergence of the global efficiency based on evolution of intelligent group behaviors by:
   establishing a general agent model of the micro-subjects with intelligent perception, communication, behavior autonomy and collaboration abilities, to simulate actual behaviors of the micro-subjects comprising a control center, a plurality of control sub-centers, a plurality of lines, a plurality of stations and a plurality of trains in the rail transit system;
   establishing a specific mathematical model of the behaviors of the micro-subjects according to duties, attributes, functions and performances of the micro-subjects; and
   generating a control center agent, a plurality of control sub-center agents, a plurality of line agents, a plurality of station agents and train agents by using the established general agent model, and then generating specific virtual entities to simulate the emergence of the global efficiency;
   c) transmitting, via network communication, signals in real time among a computer system for the control center, a plurality of computer systems for the control sub-centers, and a plurality of computer systems for the lines, the stations and the trains in the computer simulation system executed by the processor, such that a master-slave cooperation and a parallel cooperation between different computer systems and between different virtual entities are established;
   d) establishing an algorithm implemented in the computer simulation system executed by the processor to identify key elements of the emergence of the global efficiency;
   e) identifying the key elements by the computer simulation system executed by the processor through a mapping relationship between an optimal global efficiency and adjustable input parameters of the rail transit system;
   f) according to the adjustable input parameters of the rail transit system including a dynamic spatio-temporal distribution of passenger or cargo flows and a dynamic road network environment, automatically updating, at the computer simulation system executed by the processor, the global efficiency in real time through autonomous behaviors and mutual cooperation of the micro-subjects until the optimal global efficiency is generated;
   g) automatically generating, at the computer simulation system executed by the processor, a systemic solution of the rail transit system based on identification of the key elements affecting the emergence of the optimal global efficiency;
   h) determining a systematic solution of the rail transit system comprising train behaviors in a peak season or in an off season according to a transportation demand, and sending, by the control center and the sub-control centers, the systematic solution of the rail transit system to the trains; and
   i) controlling, based on the systemic solution of the rail transit system obtained in step g), the trains by automation to take off cars from the trains during the off season or add on cars to the trains during the peak season and to operate according to the train behaviors.

2. The method of claim 1, wherein the index $e_{Efficiency}$ is defined in form of an index vector and calculated according to equation (1):

$$e_{Efficiency} = \left[ e_{EnergyEfficiency} \overline{R} \frac{N_{Actual}}{N} \times 100\% \frac{\overline{t}^{New}}{\overline{t}^{Old}} \times 100\% \right]^T ; \qquad (1)$$

wherein $\overline{R}$ is an average load ratio of passenger/cargo trains; $N_{Actual}$ is an actual number of the passenger/cargo trains running in a day in the rail transit system; N is the number of trains allowed to run in a day; $\overline{t}^{New}$ is an average running time of the passenger/cargo trains after equipment update, technological transformation, system upgrade or improvement of organization and management of the rail transit system; $\overline{t}^{Old}$ is an average running time of the passenger/cargo trains of a previous rail transit system; and $e_{EnergyEfficiency}$ is a weight of cargo or the number of people carried by the passenger/cargo trains and the travel distance of the passenger/cargo trains in the rail transit system per unit of energy consumption within a preset time period.

3. The method of claim 2, wherein $e_{EnergyEfficiency}$ is calculated according to equation (2):

$$e_{EnergyEfficiency} = \frac{N^A \times D^A}{E} ; \qquad (2)$$

wherein E is a total energy consumption of the rail transit system to complete passenger/cargo transportation tasks; $N^A$ is an actual total number of passengers or the total weight of cargo that have been transported; and $D^A$ is an actual total travel distance of the passenger/cargo trains.

4. The method of claim 1, wherein the mathematical model of the behaviors of the micro-subjects is expressed as equation (3):

$$B_{i,j}^{k_{i,j}} = f_{k_{i,j}}(x_{i,j}^1, x_{i,j}^2, L, x_{i,j}^{n_{i,j}-1}, x_{i,j}^{n_{i,j}}) \qquad (3);$$

wherein $B_{i,j}^{k_{i,j}}$ *represents the behavior of the k* $_{i,j}$th micro-subject in the j th type of the i th category; $k_{i,j}$ is a serial number of the micro-subject in the j th type of the i th category; $x_{i,j}^1$, $x_{i,j}^2$, L, $x_{i,j}^{n_{i,j}-1}$, $x_{i,j}^{n_{i,j}}$ are independent variable parameters of the micro-subjects in j th type of the i th category; $n_{i,j}$ is a total number of the independent variable parameters of the micro-subjects in the j th type of the i th category; $f_{k_{i,j}}(x_{i,j}^1, x_{i,j}^2, L, x_{i,j}^{n_{i,j}-1}, x_{i,j}^{n_{i,j}})$ is a cluster of behavior functions, reflecting external perception, behavior autonomy and collaboration abilities of the $k_{i,j}$ th micro-subject; and in object-oriented models of the micro-subjects, all parameters and functions are classified into a Public type, a Protected type and a Private type according to their external visibility and privacy.

5. The method of claim 1, wherein the mathematical model of the simulation system to describe the emergence of the global efficiency of the rail transit system is expressed as equation (4):

$$e_{\text{Efficiency}} = g\left( \bigcup_{i=1,j=1}^{i=m,j=n_i} \left( \bigcup_{k_{i,j}=1}^{M_{i,j}} B_{i,j}^{k_{i,j}} \right) \right), \text{ s.t. } C = \{c_1, c_2, L, c_N\}; \quad (4)$$

wherein $M_{i,j}$ is a total number of the micro-subjects in the j th type of the i th category; m is a total number of types of the micro-subjects; $n_i$ is a total number of the micro-subjects in the i th category; U represents a non-linear cooperative relationship among the micro-subjects; wherein the micro-subjects with the same category are in parallel cooperation, and the micro-subjects with different categories are in master-slave cooperation; $c_1, c_2, L, c_N$ external constraints of the micro-subjects in collaboration; N is a total number of the external constraints; and $$g\left( \bigcup_{i=1,j=1}^{i=m,j=n_i} \left( \bigcup_{k_{i,j}=1}^{M_{i,j}} B_{i,j}^{k_{i,j}} \right) \right)$$

denotes a behavior function of the rail transit system.

6. The method of claim 1, wherein the algorithm is implemented in the simulation system to identify the key elements of the emergence of the global efficiency, and the steps of implementing the algorithm to identify the key elements comprise:

initializing or adjusting the input parameters;

performing simulation calculations and a serialized evaluation of efficiency indicators by the simulation system of the emergence of the global efficiency after the initialization of the input parameters, to obtain the global efficiency and local efficiencies; and determining whether the obtained global efficiency is optimal;

if yes, activating an output unit to output the optimal global efficiency, and identifying the key elements according to the mapping relationship between the optimal global efficiency and the adjustable input parameters; otherwise, adjusting the adjustable input parameters to circulate the simulation calculations until an acceptable optimal solution of the global efficiency is obtained to have the key elements identified.

7. The method of claim 6, wherein the algorithm runs in the simulation system to identify key elements of the emergence of the global efficiency and determine a systematic solution for the improvement of the global efficiency of the rail transit system through steps of:

determining a percentage improvement of each indicator in the index vector of the global efficiency, a percentage improvement of each indicator in the index vectors of each local efficiency, and efficiency improvement measures corresponding to each local key element, thereby determining a systematic solution to improve the global efficiency.

* * * * *